United States Patent
Watanabe

(10) Patent No.: US 10,291,328 B2
(45) Date of Patent: May 14, 2019

(54) OPTICAL SIGNAL-PROCESSING APPARATUS, RECEIVING APPARATUS, AND OPTICAL NETWORK SYSTEM

(71) Applicant: FUJITSU LIMITED, Kawasaki-shi, Kanagawa (JP)

(72) Inventor: Shigeki Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/601,486

(22) Filed: May 22, 2017

(65) Prior Publication Data

US 2017/0264370 A1 Sep. 14, 2017

Related U.S. Application Data

(60) Division of application No. 14/617,516, filed on Feb. 9, 2015, now Pat. No. 9,692,520, which is a division
(Continued)

(51) Int. Cl.
| | |
|---|---|
| *H04B 10/60* | (2013.01) |
| *H04B 10/54* | (2013.01) |
| *H04B 10/07* | (2013.01) |
| *H04J 14/02* | (2006.01) |
| *G02F 1/39* | (2006.01) |

(Continued)

(52) U.S. Cl.
CPC .......... *H04B 10/541* (2013.01); *G02F 1/395* (2013.01); *H04B 10/07* (2013.01); *H04B 10/0773* (2013.01); *H04B 10/299* (2013.01); *H04B 10/616* (2013.01); *H04J 14/02* (2013.01); *H04J 14/0227* (2013.01); *H04J 14/0275* (2013.01); *H04J 14/0276* (2013.01);
(Continued)

(58) Field of Classification Search
CPC .. H04B 10/541; H04B 10/07; H04B 10/0773; H04B 10/299; H04B 10/616; H04B 2210/074; G02F 1/395; G02F 2001/392; H04J 14/02; H04J 14/0227; H04J 14/0275; H04J 14/0276; H04J 14/0221
USPC .................................................. 398/202–214
See application file for complete search history.

(56) References Cited

U.S. PATENT DOCUMENTS

| | | | |
|---|---|---|---|
| 5,012,484 A | 4/1991 | Flynn et al. | |
| 5,309,268 A | * 5/1994 | Nakamura | H04B 10/29 398/160 |

(Continued)

FOREIGN PATENT DOCUMENTS

| | | |
|---|---|---|
| EP | 0836112 A2 | 4/1998 |
| EP | 1389742 | 2/2004 |

(Continued)

OTHER PUBLICATIONS

European Office Action dated Dec. 21, 2017 in related European Patent Application No. 09850854.2 (6 pages).
(Continued)

*Primary Examiner* — Kenneth N Vanderpuye
*Assistant Examiner* — Dibson J Sanchez
(74) *Attorney, Agent, or Firm* — Staas & Halsey LLP

(57) ABSTRACT

An optical modulator combines and inputs a signal light propagating through the optical network and a control light having information concerning the optical network to a nonlinear optical medium. The optical modulator modulates the signal light according to changes in intensity of the control light, in the nonlinear optical medium.

1 Claim, 18 Drawing Sheets

Related U.S. Application Data of application No. 13/431,710, filed on Mar. 27, 2012, now Pat. No. 8,983,296, which is a continuation of application No. PCT/JP2009/068703, filed on Oct. 30, 2009.

(51) Int. Cl.
*H04B 10/61* (2013.01)
*H04B 10/077* (2013.01)
*H04B 10/299* (2013.01)

(52) U.S. Cl.
CPC ........ *G02F 2001/392* (2013.01); *H04B 10/60* (2013.01); *H04B 2210/074* (2013.01); *H04J 14/0221* (2013.01)

(56) References Cited

U.S. PATENT DOCUMENTS

| | | | |
|---|---|---|---|
| 5,432,632 A | 7/1995 | Watanabe | |
| 5,530,584 A | 6/1996 | Myslinski | |
| 5,596,436 A | 1/1997 | Sargis | |
| 5,596,667 A | 1/1997 | Watanabe | |
| 5,896,211 A * | 4/1999 | Watanabe | H04B 10/50 398/187 |
| 6,049,642 A | 4/2000 | Nakamura | |
| 6,101,024 A | 8/2000 | Islam | |
| 6,108,113 A * | 8/2000 | Fee | H04B 10/03 398/1 |
| 6,222,658 B1 | 4/2001 | Dishman | |
| 6,407,843 B1 | 6/2002 | Rowan | |
| 6,424,773 B1 * | 7/2002 | Watanabe | G02F 1/3519 385/122 |
| 6,453,082 B1 * | 9/2002 | Watanabe | G02F 1/3519 385/15 |
| 6,504,636 B1 * | 1/2003 | Seto | H04B 10/504 398/163 |
| 6,522,818 B1 | 2/2003 | Aso | |
| 6,529,314 B1 | 3/2003 | Shukunami | |
| 6,529,315 B2 | 3/2003 | Bartolini | |
| 6,771,864 B2 | 8/2004 | Kubo | |
| 6,798,994 B1 * | 9/2004 | Tsao | H04B 10/0779 398/140 |
| 6,922,503 B2 | 7/2005 | Hasegawa | |
| 6,959,135 B1 | 10/2005 | Bickham | |
| 7,146,103 B2 * | 12/2006 | Yee | H04B 10/2507 398/68 |
| 7,292,792 B2 | 11/2007 | Chen | |
| 7,343,065 B2 | 3/2008 | Maeda | |
| 7,346,279 B1 * | 3/2008 | Li | H04B 10/40 398/155 |
| 7,526,211 B2 | 4/2009 | Mcnicol | |
| 2002/0041435 A1 | 4/2002 | Krummrich | |
| 2002/0057880 A1 | 5/2002 | Hirano | |
| 2002/0080469 A1 * | 6/2002 | Leuthold | H04B 10/299 359/326 |
| 2002/0114061 A1 | 8/2002 | Naito | |
| 2002/0167708 A1 * | 11/2002 | Tsao | H04B 10/118 398/204 |
| 2002/0176183 A1 | 11/2002 | Erz | |
| 2003/0063860 A1 * | 4/2003 | Watanabe | G02F 1/3519 385/39 |
| 2003/0128414 A1 * | 7/2003 | Watanabe | H04B 10/299 359/237 |
| 2004/0005153 A1 | 1/2004 | Watanabe | |
| 2004/0066550 A1 | 4/2004 | Jay | |
| 2004/0190909 A1 | 9/2004 | Akasaka | |
| 2005/0111499 A1 | 5/2005 | Tanaka | |
| 2005/0111599 A1 | 5/2005 | Walton | |
| 2005/0201753 A1 * | 9/2005 | Bai | H04B 10/0775 398/30 |
| 2006/0045445 A1 | 3/2006 | Watanabe | |
| 2006/0051100 A1 | 3/2006 | Watanabe | |
| 2006/0159463 A1 * | 7/2006 | Futami | G01J 11/00 398/152 |
| 2006/0291867 A1 * | 12/2006 | Tamura | G02F 1/3515 398/152 |
| 2006/0291868 A1 * | 12/2006 | Yee | H04B 10/50 398/152 |
| 2007/0230518 A1 * | 10/2007 | Watanabe | H04B 10/299 372/22 |
| 2008/0080856 A1 | 4/2008 | Kagawa | |
| 2008/0131138 A1 * | 6/2008 | Futami | G01J 11/00 398/152 |
| 2008/0165365 A1 * | 7/2008 | Watanabe | H04B 10/0795 356/484 |
| 2008/0165412 A1 * | 7/2008 | Watanabe | G02F 1/395 359/341.3 |
| 2008/0232808 A1 * | 9/2008 | Watanabe | H04B 10/299 398/92 |
| 2008/0298813 A1 | 12/2008 | Song | |
| 2010/0021105 A1 | 1/2010 | Watanabe | |
| 2010/0183303 A1 | 7/2010 | Okabe | |
| 2010/0254649 A1 | 10/2010 | Schofield | |
| 2010/0266291 A1 * | 10/2010 | Boffi | H04B 10/61 398/159 |
| 2015/0155947 A1 | 6/2015 | Watanabe | |

FOREIGN PATENT DOCUMENTS

| | | |
|---|---|---|
| EP | 1633066 | 3/2006 |
| EP | 1811703 | 7/2007 |
| EP | 1830224 | 9/2007 |
| EP | 2031784 | 3/2009 |
| EP | 2199846 | 6/2010 |
| JP | WO 94/09403 | 4/1994 |
| JP | 08-029817 | 2/1996 |
| JP | 2000-031901 | 1/2000 |
| JP | 2000-049703 | 2/2000 |
| JP | 2001-183711 | 7/2001 |
| JP | 3436310 | 6/2003 |
| JP | 2006-184851 | 7/2006 |
| JP | 2007-047828 | 2/2007 |
| JP | 2007-133426 | 5/2007 |
| WO | 2009/047856 | 4/2009 |

OTHER PUBLICATIONS

Patent Abstracts of Japan, Publication No. 08-029817, published Feb. 2, 1996.
S. Watanabe et al., "*Simultaneous Wavelength Conversion and Optical Phase Conjugation of 200 Gb/s (5x40 Gb/s) WDM Signal Using a Highly Nonlinear Fiber Four-wave Mixer*", ICOC-ECOC, vol. 5, Sep. 22-25, 1997, 11$^{th}$ International Conference on Integrated Optics and Optical Fibre Communications 23$^{rd}$ European Conference on Optical Communications, IEEE Conference Publication XP006508700, ISBN: 978-0-85296-697-6, pp. 1-4.
"*All-Optical Label Swapping Networks and Technologies*"; Blumenthal et al., Journal of Lightwave Technology, Dec. 2000. vol. 18, No. 12, pp. 2058-2075.
Patent Abstracts of Japan, Publication No. 2000-049703, published Feb. 18, 2000.
Patent Abstracts of Japan, Publication No. 2001-183711, published Jul. 6, 2001.
"*A new high bit rate orthogonal IM/FSK scheme based on an all fiber realization, for AOLS applications*", Skarmoutsos et al., ECOC Proceedings, Sep. 2005, vol. 3, pp. 683-684.
G. Contestabile et al., "*Double-Stage Cross-Grain Modulation in SOAs: An Effective Technique for WDM Multicasting*", IEEE Photonics Technology Letters, vol. 18, No. 1, Jan. 1, 2006, XP55062719, ISSN: 1041-1135, DOI: 10.1109/LPT.2005.861626, pp. 181-183.
Patent Abstracts of Japan, Publication No. 2006-184851, Published Jul. 13, 2006.
Patent Abstracts of Japan, Publication No. 047828, Published Feb. 22, 2007.
D.M. Forin et al., "*Ultrawide bandwidth λ-converter with regeneration properties based on cross-phase modulation effect in highly non linear dispersion flattened fiber*", Optical Fiber Communication (OFC 2007), Collocated National Fiber Optic Engineers Conference, Mar. 25-29, 2007, XP031146401, ISBN: 978-1-55752-831-5, 3 pp.

(56) References Cited

OTHER PUBLICATIONS

Patent Abstracts of Japan, Publication No. 2007-133426, Published May 31, 2007.
Extended European Search Report dated May 18, 2009 in European Patent Application No. 08164874.3.
International Search Report dated Dec. 22, 2009 in Application No. PCT/JP2009/068703.
Patent Abstracts of Japan, Publication No. 2000-031901, published Jan. 28, 2010.
Office Action dated Dec. 16, 2010 in U.S. Appl. No. 12/232,684.
Office Action dated Mar. 4, 2011 in U.S. Appl. No. 12/232,684.
Notice of Allowance dated Sep. 26, 2011 in U.S. Appl. No. 12/232,684.
Notice of Allowance dated May 21, 2012 in U.S. Appl. No. 12/232,684.
Extended European Search Report dated Mar. 18, 2013 in European Application No. 11168205.0.
Extended European Search Report dated May 22, 2013 for corresponding European Patent Application No. 09850854.2.
Office Action dated Nov. 7, 2013 in U.S. Appl. No. 13/067,283 (double patenting rejections).
Japanese Office Action dated Jan. 14, 2014 in Application No. 2010-191694.
Office Action dated Mar. 7, 2014 in U.S. Appl. No. 13/067,283.
Office Action dated Apr. 21, 2014 in corresponding U.S. Appl. No. 13/431,710.
Office Action dated Jun. 5, 2014 in related U.S. Appl. No. 13/067,283.
Notice of Allowance dated Jun. 6, 2014 in related U.S. Appl. No. 13/173,230.
Office Action dated Aug. 5, 2014 in corresponding U.S. Appl. No. 13/431,710.
U.S. Office Action dated Oct. 10, 2014 in related U.S. Appl. No. 13/067,283.
Notice of Allowance dated Nov. 10, 2014 in corresponding U.S. Appl. No. 13/431,710.
Notice of Allowance dated Dec. 22, 2014 in corresponding U.S. Appl. No. 13/173,230.
European Patent Office Action dated Nov. 17, 2016 for corresponding European Application No. 09850854.2.
Watanabe et al., "*Optical FM and Heterodyne Detection of 2-Channel 560MBIT/S Subcarrier Multiplexed Ask Signal Using 3-Electrode DFB-LDS*", Electronics Letters, vol. 27, No. 1, IEE STEVENAGE, Jan. 1991, Great Britain, pp. 44-45.
Non-Final Office Action dated Sep. 27, 2016 in corresponding U.S. Appl. No. 14/617,516 (8 pages).
Notice of Allowance dated Feb. 23, 2017 in corresponding U.S. Appl. No. 14/617,516 (20 pages).
U.S. Appl. No. 13/431,710, filed Mar. 27, 2012, Watanabe, Fujitsu Limited Kawasaki-shi, JP.
U.S. Appl. No. 14/617,516, filed Feb. 9, 2015 Watanabe, Fujitsu Limited Kawasaki-shi, JP.

\* cited by examiner

OPTICAL SIGNAL-PROCESSING APPARATUS, RECEIVING APPARATUS, AND OPTICAL NETWORK SYSTEM

CROSS-REFERENCE TO RELATED APPLICATION

This application is a divisional of U.S. patent application Ser. No. 14/617,516, filed on Feb. 9, 2015, which is a divisional of U.S. patent application Ser. No. 13/431,710, filed on Mar. 27, 2012, now U.S. Pat. No. 8,983,296, which is a continuation of International Patent Application No. PCT/JP2009/068703, filed on Oct. 30, 2009, the entire contents of which are incorporated herein by reference.

FIELD

The embodiments discussed herein are related to an optical signal-processing apparatus that sequentially superposes and multiplexes information onto a signal light, a receiving apparatus, and an optical network system.

BACKGROUND

It is necessary for a future optical network to perform, for example, processing, such as branching and inserting of a signal light and switching of the same, at an apparatus, such as a repeating optical node, which is placed at a location remote from a terminal apparatus, while using a conventional optical communication system as a basis. In doing the above, it is effective from a viewpoint of energy efficiency to propagate and process information such that as little conversion as possible is performed between an optical signal and an electric signal.

However, an existing repeating optical node or the like performs signal processing by photoelectric conversion as performed in a terminal apparatus, and for example, a transmitted signal light is once converted to an electric signal, and this electric signal is electrically processed, whereafter the processed electric signal is converted to an optical signal again. This complicates the apparatus configuration, and further necessitates large electric power to perform photoelectric conversion.

By the way, in an optical network, various kinds of information are monitored at various points on a real-time basis, and effective network control is performed based on the monitored information. In a future optical network, the amount of such information increases, and hence it becomes effective to realize an energy-saving optical network. Further, to realize a more flexible optical network, a function is effective in which information is inserted into the network not only at an optical node, but also at a desired point.

However, at present, insertion of information is performed at an optical node apparatus or a terminal apparatus, and particularly, monitored information is propagated e.g. by performing photoelectric conversion of a signal light and writing the information into a header part of the signal light, or by using a dedicated optical wave.

Note that a transmission technique is known in which in a relay station, which is disposed between a transmitting station and a receiving station via an optical transmission path, there are provided a phase conjugate light-generating device that has signal light/pump light-supplying means for supplying a signal light input from the transmitting station and a pump light to a nonlinear optical medium, and signal light/phase conjugate light-extracting means for extracting an output signal light generated by modulating the input signal light by the pump light, and a phase conjugate light, using the input signal light and the pump light supplied to the nonlinear optical medium, and modulation means for modulating the pump light based on monitored data specific to the relay station, wherein the signal light containing the modulated monitored data and the phase conjugate light are transmitted to the receiving apparatus station (e.g. see Japanese Patent No. 3436310).

As described above, the conventional optical network has a problem that due to photoelectric conversion performed on a signal light, a large power loss is caused by insertion of another signal or propagation of information.

SUMMARY

In one aspect of the embodiments, there is provided an optical signal-processing apparatus including: an optical modulator configured to combine and input a first signal light and a second signal light having information to a nonlinear optical medium, and modulate the first signal light according to changes in intensity of the second signal light, in the nonlinear optical medium.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereafter, a first embodiment will be described in detail with reference to a drawing.

Figure 1:
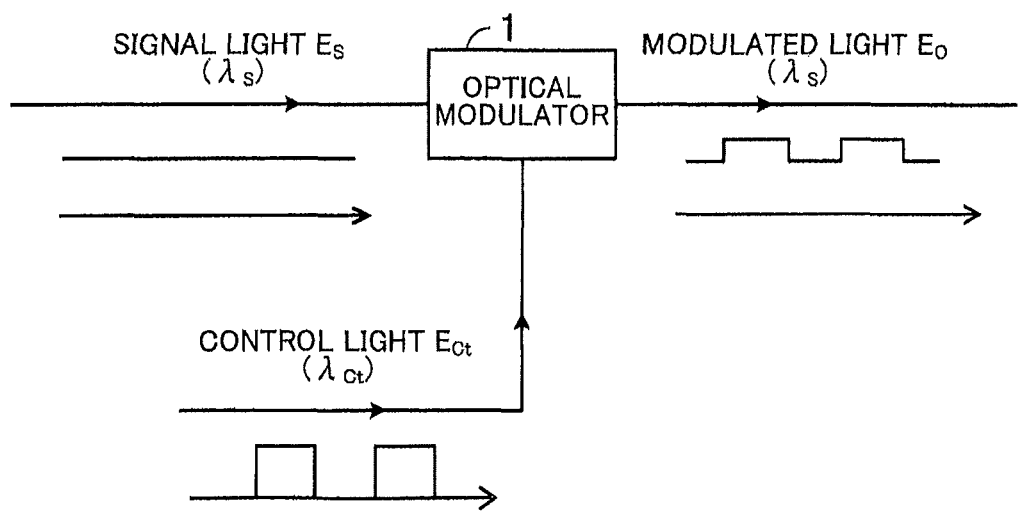
FIG. 1 illustrates an optical signal-processing apparatus according to a first embodiment.

FIG. 1 illustrates an optical signal-processing apparatus according to a first embodiment. As illustrated in FIG. 1, the optical signal-processing apparatus includes an optical modulator 1.

A signal light $E_S$ having a wavelength $\lambda_S$ and a control light $E_{Ct}$ having a wavelength $\lambda_{Ct}$ are input to the optical modulator 1. The signal light $E_S$ is a signal light propagating through an optical network. The signal light $E_S$ is e.g. a continuous wave (CW) light or a signal light having data signal. The control light $E_{Ct}$ is e.g. a signal light having information concerning the data signal or the optical network. The information is e.g. information on a data signal inserted into the network at a repeating optical node, information for operating and managing optical network apparatuses forming the optical network, and information on monitored images, and temperature, pressure, electric power, etc.

The optical modulator 1 has a nonlinear optical medium. The optical modulator 1 combines and inputs the input signal light $E_S$ and the control light $E_{Ct}$ to the nonlinear optical medium thereof. The optical modulator 1 modulates the signal light $E_S$ by the control light $E_{Ct}$ in the nonlinear optical medium, and outputs a modulated light $E_O$ having a wavelength $\lambda_S$ and modulated based on information contained in the control light $E_{Ct}$.

Let it be assumed, for example, that the signal light $E_S$ and the control light $E_{Ct}$ having respective waveforms illustrated in FIG. 1 are input to the optical modulator 1. In this case, the signal light $E_S$ is intensity-modulated using the control light $E_{Ct}$ by the optical modulator 1, as illustrated in the waveform of the modulated light $E_O$ in FIG. 1. That is, the optical signal-processing apparatus is capable of superposing the information contained in the control light $E_{CT}$ on the signal light $E_S$ propagating through the optical network without performing photoelectric conversion of the signal light $E_S$.

The optical signal-processing apparatus thus modulates the signal light $E_S$ having the wavelength $\lambda_S$ according to the information contained in the control light $E_{Ct}$ having the wavelength $\lambda_{Ct}$, in the nonlinear optical medium. This makes it possible to superpose the information contained in the control light $E_{Ct}$ on the signal light $E_S$ without performing photoelectric conversion of the signal light $E_S$, which makes it possible to reduce power loss.

Further, this makes it possible to insert information into the optical network at a desired point within the optical network to transmit the information therethrough, receive the inserted information after transmission, and recognize the information as the information from the desired point. Further, in a case where the information is e.g. monitored information, it is not necessary, for example, to use another communication network, such as a wireless network, to propagate the information.

Note that when a signal is superposed as illustrated in FIG. 1, the optical modulator 1 modulates the signal light $E_S$ by the control light $E_{Ct}$ without adversely affecting the data signal in the signal light $E_S$.

Next, a second embodiment will be described in detail with reference to a drawing. In the second embodiment, a description will be given of an example in which a WDM (Wavelength Division Multiplexing) signal light is modulated by the control light.

Figure 2:
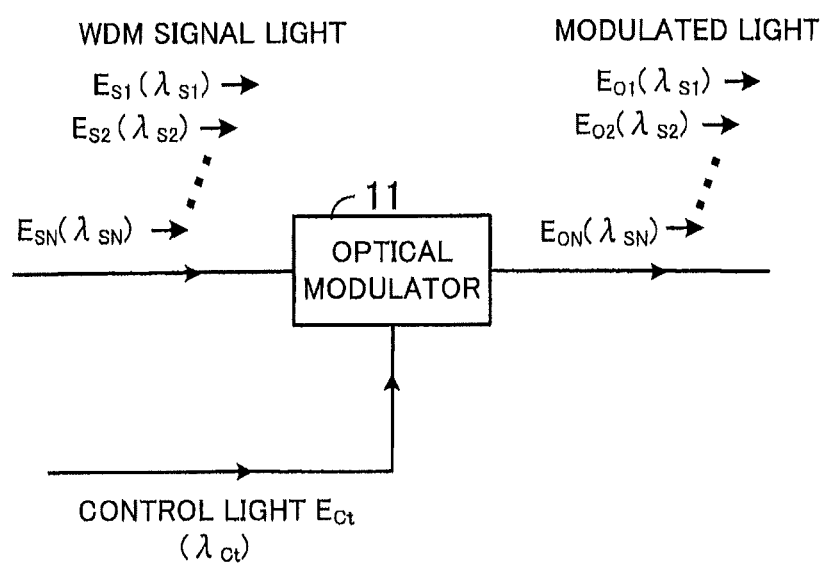
FIG. 2 illustrates an optical signal-processing apparatus according to a second embodiment.

FIG. 2 illustrates an optical signal-processing apparatus according to the second embodiment. As illustrated in FIG. 2, the optical signal-processing apparatus includes an optical modulator 11.

Input to the optical modulator 11 are an N-channel WDM signal light including signal lights $E_{S1}, E_{S2}, \ldots, E_{SN}$ having respective wavelengths $\lambda_{S1}, \lambda_{S2}, \ldots, \lambda_{SN}$, and a control light $E_{Ct}$ having a wavelength $\lambda_{Ct}$.

The optical modulator 11 has a nonlinear optical medium. The optical modulator 11 combines and inputs the input WDM signal light and the control light $E_{Ct}$ to the nonlinear optical medium. The optical modulator 11 modulates the WDM signal light by the control light $E_{Ct}$ in the nonlinear optical medium, and outputs modulated lights $E_{O1}, E_{O2}, \ldots, E_{ON}$ having respective wavelengths $\lambda_{S1}, \lambda_{S2}, \ldots, X_{SN}$ (WDM signal light), modulated based on the information contained in the control light $E_{Ct}$. In other words, the optical modulator 11 outputs the WDM signal light as the modulated lights $E_{O1}, E_{O2}, \ldots, E_{ON}$ on each of which the information contained in the control light $E_{Ct}$ is superposed.

As described above, the optical signal-processing apparatus is capable of modulating the WDM signal light by the control light $E_{Ct}$.

Next, a third embodiment will be described in detail with reference to a drawing. In the third embodiment, a description will be given of an example in which the WDM signal light modulated in the second embodiment is split by an optical splitter.

Figure 3:
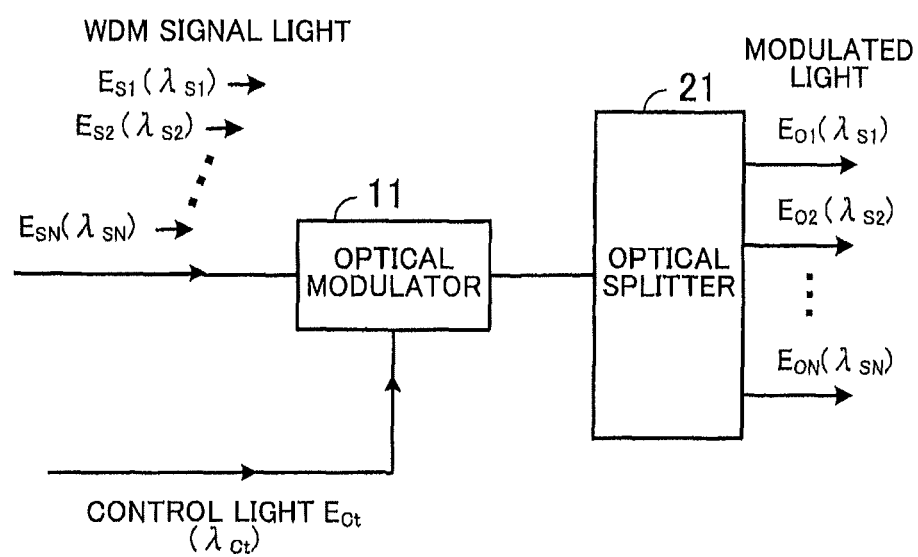
FIG. 3 illustrates an optical signal-processing apparatus according to a third embodiment.

FIG. 3 illustrates an optical signal-processing apparatus according to the third embodiment. As illustrated in FIG. 3, the optical signal-processing apparatus includes the optical modulator 11 and the optical splitter 21. Note that the optical modulator 11 is the same as the optical modulator illustrated in FIG. 2, and description thereof is omitted.

The optical splitter 21 splits a WDM signal light modulated by the optical modulator 11 into modulated lights $E_{O1}, E_{O2}, \ldots, E_{ON}$, having respective wavelengths $\lambda_{S1}, \lambda_{S2}, \ldots, \lambda_{SN}$, and outputs the split modulated lights.

That is, in the optical signal-processing apparatus illustrated in FIG. 3, the WDM signal light modulated by the optical modulator 11 is split by the optical splitter 21 into the modulated lights having the respective wavelengths, and the modulated lights are output therefrom. This makes it possible to match with optical systems having different wavelength bands.

Next, a fourth embodiment will be described in detail with reference to a drawing. In the fourth embodiment, a description will be given of an example in which a signal light is modulated using a control light by optical parametric amplification using an optical fiber.

Figure 4:
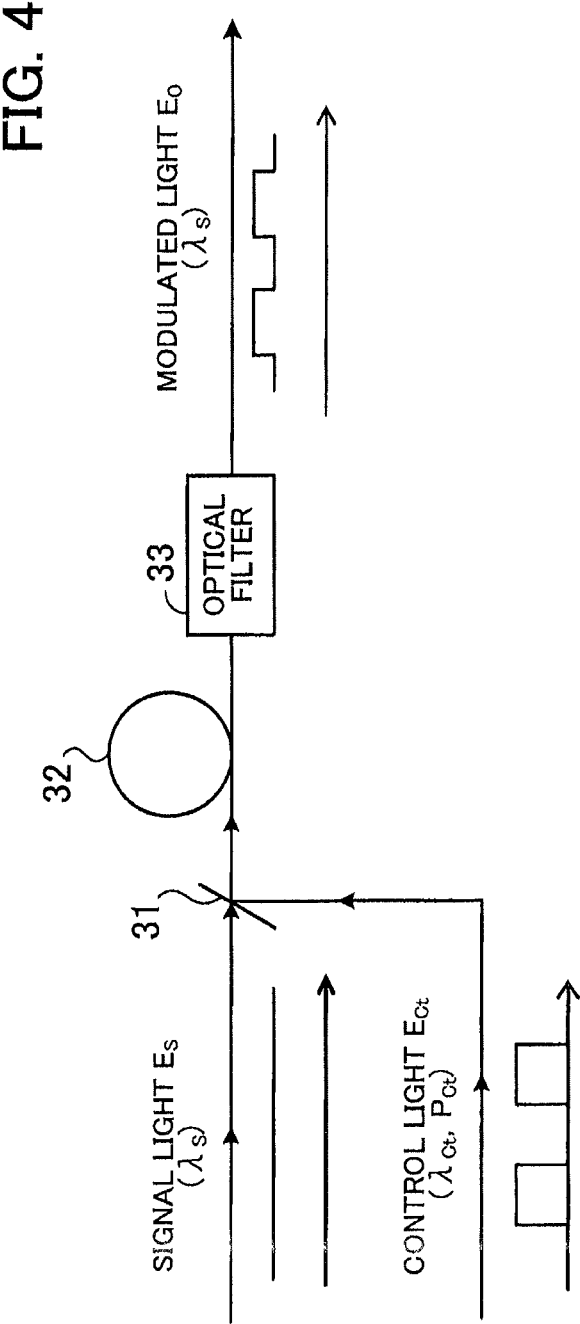
FIG. 4 illustrates an optical signal-processing apparatus according to a fourth embodiment.

FIG. 4 illustrates an optical signal-processing apparatus according to the fourth embodiment. As illustrated in FIG. 4, the optical signal-processing apparatus includes an optical coupler 31, an optical fiber 32, and an optical filter 33.

The signal light $E_S$ having a wavelength $\lambda_S$, and the control light $E_{Ct}$ having a wavelength $\lambda_{Ct}$ and an optical power $P_{Ct}$ are input to the optical coupler 31. The optical coupler 31 combines and outputs the signal light $E_S$ and the control light $E_{Ct}$ to the optical fiber 32. As the optical coupler 31, there may be used e.g. a WDM coupler. The WDM coupler has a small transmission loss, and is capable of combining and splitting the control light $E_{Ct}$ and the signal light $E_S$ almost without affecting the signal light $E_S$.

The optical fiber 32 uses the control light $E_{Ct}$ as pump light and modulates the signal light $E_S$ according to changes in intensity of the optical power $P_{Ct}$ of the control light $E_{Ct}$, and outputs the modulated light $E_O$ having the wavelength $\lambda_S$. As the optical power $P_{Ct}$ of the control light $E_{Ct}$ is increased, the signal light $E_S$ is optical parametrically amplified by four-wave mixing (FWM) in the optical fiber 32. This makes it possible to amplify and modulate the signal light $E_S$ according to the information contained in the control light $E_{Ct}$ (e.g. 0, 1).

The optical filter 33 is an optical filter for blocking the control light $E_{Ct}$ and passing the signal light $E_S$. As the optical filter 33, there may be used, for example, an optical bandpass filter, a band blocking filter that blocks wavelength components other than the signal light $E_S$, or a WDM optical coupler (used in a state in which the input-output direction thereof is opposite to that of the optical coupler 31).

As described above, the optical signal-processing apparatus modulates the signal light $E_S$ having the wavelength $\lambda_S$ according to changes in intensity of the control light $E_{Ct}$ having the wavelength $\lambda_{Ct}$, in the optical fiber 32. This makes it possible to superpose information contained in the control light $E_{Ct}$ on the signal light $E_S$ having the wavelength $\lambda_S$ without performing photoelectric conversion of the signal light $E_S$.

Note that optical parametric amplification selectively occurs with respect to the signal light $E_S$ having the same polarization component as that in the control light $E_{Ct}$. Therefore, the signal light $E_S$ and the control light $E_{Ct}$ may be controlled to be in the optimum polarization state or in the random polarization state (polarization scramble), using a polarization controller, or may be caused to operate with respect to a desired polarization state by a polarization diversity configuration.

Further, FWM and optical parametric amplification in the optical fiber 32 have response times of femtosecond order. Optical modulation is possible even at a data speed beyond a terabit, and the operation is possible without depending on the data speed of the control light $E_{Ct}$.

Further, the optical signal-processing apparatus illustrated in FIG. 4 is also capable of modulating the WDM signal as described with reference to FIG. 2, and is also capable of splitting the WDM signal modulated by the optical splitter as described with reference to FIG. 3.

Further, an optical filter for preventing the control light $E_{Ct}$ from being output may be disposed downstream of the optical fiber 32. For example, a WDM coupler is disposed which splits the signal light $E_S$ and the control light $E_{Ct}$ and passes the signal light $E_S$ having the wavelength $\lambda_S$. This makes it possible to prevent the control light $E_{Ct}$ from propagating through the optical network.

Next, a fifth embodiment will be described in detail with reference to a drawing. In the fifth embodiment, a description will be given of an example in which an idler light is modulated.

Figure 5:
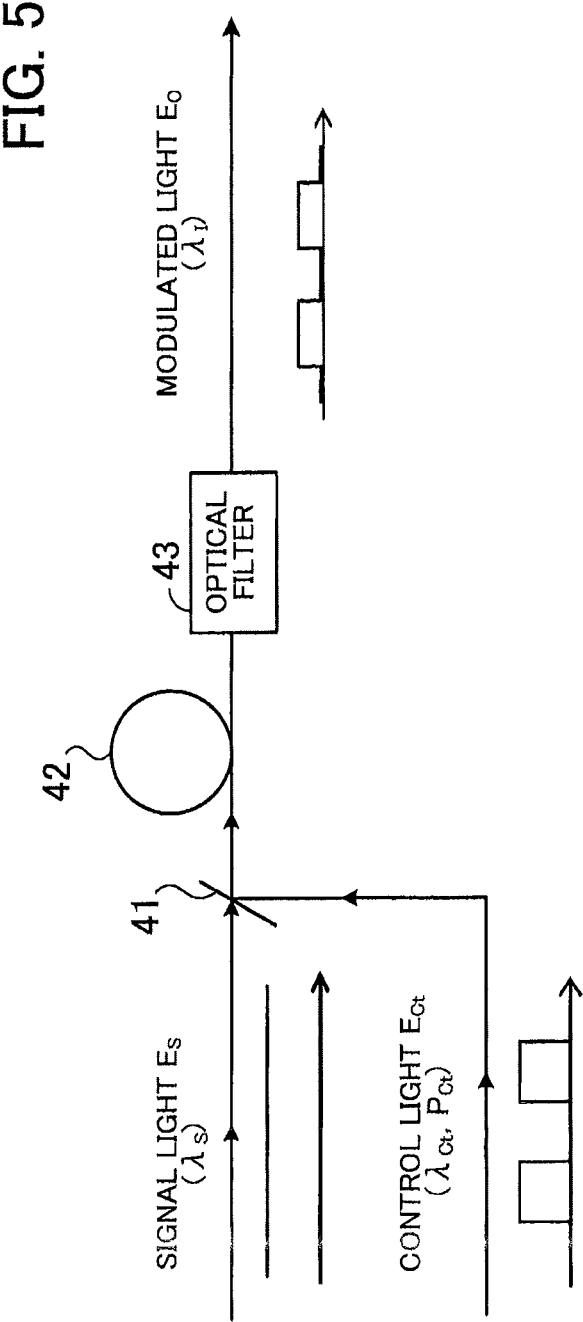
FIG. 5 illustrates an optical signal-processing apparatus according to a fifth embodiment.

FIG. 5 illustrates an optical signal-processing apparatus according to the fifth embodiment. As illustrated in FIG. 5, the optical signal-processing apparatus includes an optical coupler 41, an optical fiber 42, and an optical filter 43.

The optical coupler 41 is the same as the optical coupler 31 described with reference to FIG. 4. The optical coupler 41 combines and outputs the signal light $E_S$ and the control light $E_{Ct}$ to the optical fiber 42.

The optical fiber 42 outputs an idler light (having a wavelength $\lambda_I$) of the signal light $E_S$ generated by FWM, as an intensity-modulated light.

The optical filter 43 is an optical filter that passes the idler light (modulated light $E_O$) optically modulated by the signal light $E_S$ and the control light $E_{Ct}$. As the optical filter 43, there may be used an optical bandpass filter, a band blocking filter which blocks wavelength components other than the idler light $E_I$, or a WDM optical coupler.

As described above, the optical signal-processing apparatus modulates the idler light having the wavelength $\lambda_I$, which is generated in the optical fiber 42, according to changes in intensity of the control light $E_{Ct}$ having the wavelength $\lambda_{Ct}$. This makes it possible to superpose information contained in the control light $E_{Ct}$ on the idler light having the wavelength $\lambda_I$ without performing photoelectric conversion of the signal light $E_S$.

Note that the optical signal-processing apparatus illustrated in FIG. 5 is also capable of modulating the WDM signal as described with reference to FIG. 2, and is also capable of splitting the WDM signal modulated by the optical splitter as described with reference to FIG. 3.

Hereafter, the optical parametric amplification and the idler light will be described. The frequencies of the control light $E_{Ct}$, the idler light, and the signal light $E_S$ are represented by $\omega_{Ct}$, $\omega_I$, and $\omega_S$, respectively. The frequencies $\omega_{Ct}$, $\omega_I$, and $\omega_S$ satisfy the following Expression (1):

$$\omega_{Ct} - \omega_I = \omega_S - \omega_{Ct} \neq 0 \qquad (1)$$

Now, the optical fiber is used as the nonlinear optical medium, and the length of the optical fiber is represented by L while a loss is represented by $\alpha$. Further, it is assumed that in the optical fiber, all light waves are in the same polarization state, and the input power of the control light $E_{Ct}$ is sufficiently larger than the optical power of the signal light $E_S$ and the optical power of the idle light.

When the wavelength $\lambda_{Ct}$ of the control light $E_{Ct}$ is adjusted to the zero-dispersion wavelength $\lambda_0$ of the optical fiber, by way of example, the signal light $E_S$ and the idler light output from the optical fiber are approximately given a gain $G_S$ and a gain $G_I$, respectively, expressed by the following Expressions (2) and (3):

$$G_S = \exp(-\alpha L)[1 + \phi^2(L)] \qquad (2)$$

$$G_I = \exp(-\alpha L)[\phi^2(L)] \qquad (3)$$

Note that $\phi(L)$ represents a nonlinear optical phase shift, and is given by the following Expression (4):

$$\phi(L) = \gamma P_P(0) l(L) \qquad (4)$$

Here, $P_P(0)$ represents the input power of the control light $E_{Ct}$, and $l(L)$ represents a nonlinear interaction length, and is given by the following Expression (5):

$$l(L) = (1 - e^{-\alpha L})/\alpha L \qquad (5)$$

Further, $\gamma$ represents a third-order nonlinear coefficient, and is given by the following Expression (6):

$$\gamma = \frac{\omega n_2}{c A_{\mathit{eff}}} \qquad (6)$$

Here, $n_2$ and $A_{\mathit{eff}}$ represent a nonlinear refraction index and an effective core cross-sectional area within the optical fiber, respectively.

The optical parametric amplification gain $G_S$ changes with respect to the nonlinear coefficient, the input power of the control light $E_{Ct}$ as the pump light, and the magnitude of the interaction length. Particularly, under the condition of $\lambda_{Ct}=\lambda_0$ which provides wide wavelength range of constant generation efficiency, the gain approximately increases by the square of the value of the product as indicated by the Expressions (2) and (3), and the power variation corresponding to the increase in the gain causes amplitude modulation.

Here, the generation efficiency of the optical parametric effect strongly depends on the polarization state of the interacting light waves. Specifically, when the light waves input to the optical fiber are in the same polarization state, the generation efficiency of the FWM becomes maximum, whereas when the light waves are in polarization states orthogonal to each other, the FWM is reduced.

From the Expression (3), the generation efficiency of the idler light is increased by increasing the optical power of the control light $E_{Ct}$ as the pump light, and hence by preparing the control light $E_{Ct}$ at a high optical power level, it is possible to perform optical intensity modulation with high efficiency.

As an optical intensity modulator, it is possible to use e.g. a Mach-Zehnder interferometer optical fiber switch or a nonlinear optical loop mirror switch other than the above-mentioned one.

Note that the optical fiber may have a zero-dispersion wavelength on a shorter wavelength side than the wavelength of the control light $E_{Ct}$ as the pump light, and set a value of the product of a chromatic dispersion, the wavelength separation of the control light $E_{Ct}$ and the signal light $E_S$, the value of the nonlinear optical coefficient, the optical power of the control light $E_{Ct}$, and a length of the optical fiber to achieve the phase matching condition of an optical parametricamplification.

Next, a sixth embodiment will be described in detail with reference to a drawing. In the sixth embodiment, a description will be given of an example of optical phase modulation using cross phase modulation (XPM) within an optical fiber. In this case, it is possible to perform phase modulation with a value corresponding to twice as large as the value given by the Expression (4), with respect to the same control light power. In doing this, it is not necessary to set the zero-dispersion wavelength of the optical fiber and the wavelength of the control light to match each other.

Figure 6:
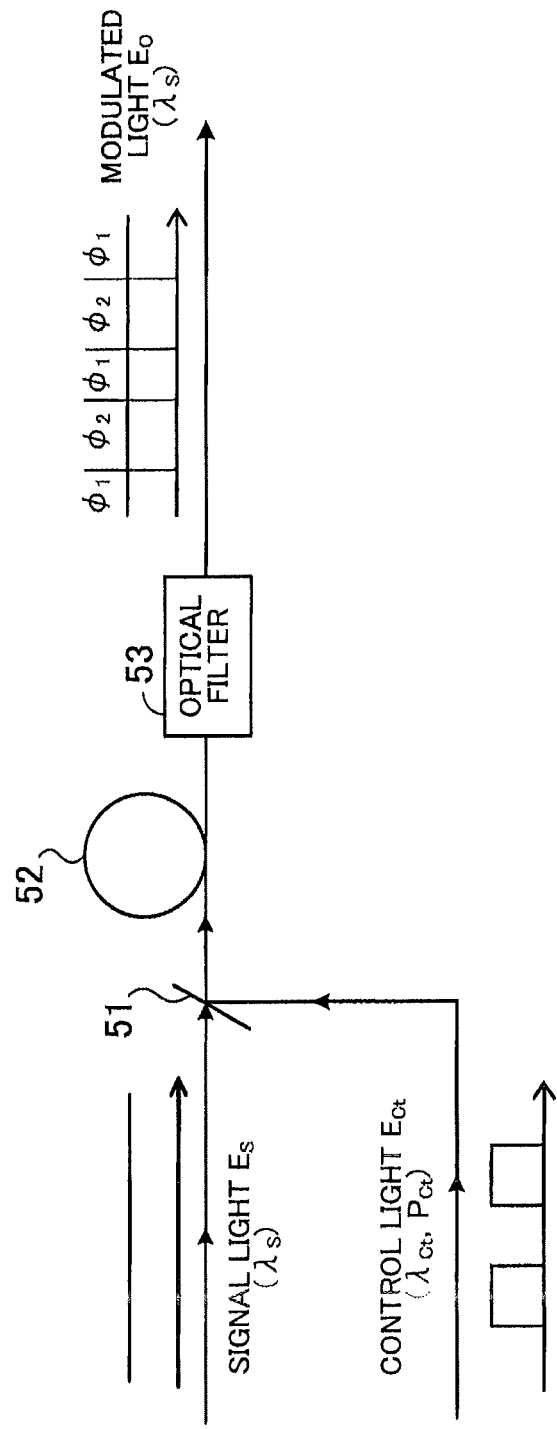
FIG. 6 illustrates an optical signal-processing apparatus according to a sixth embodiment.

FIG. 6 illustrates an optical signal-processing apparatus according to the sixth embodiment. As illustrated in FIG. 6, the optical signal-processing apparatus includes an optical coupler 51, an optical fiber 52, and an optical filter 53.

The optical coupler 51 is the same as the optical coupler 31 described with reference to FIG. 4. The optical coupler 51 combines and outputs the signal light $E_S$ and the control light $E_{Ct}$ to the optical fiber 52.

The control light $E_{Ct}$ and the signal light $E_S$ may have respective polarization states adjusted such that desired optical modulation can be obtained, and then are input to the optical coupler 51.

The optical fiber 52 changes the phase of the signal light $E_S$ according to changes in intensity of the control light $E_{Ct}$ (XPM). That is, the optical fiber 52 gives optical phase modulation according to changes in intensity of the control light $E_{Ct}$ to the signal light $E_S$.

For example, as illustrated in the waveform of the modulated light $E_0$ in FIG. 6, when the optical power $P_{Ct}$ of the control light $E_{Ct}$ is small, the phase of the signal light $E_S$ is equal to $\phi_1$, and when the optical power $P_{Ct}$ of the control light $E_{Ct}$ is large, the phase of the signal light $E_S$ is equal to $\phi_2$.

A phase difference in the given phase modulation $\Delta\phi=|\phi_1\phi_2|$ is determined according to intensity of the control light $E_{Ct}$, a nonlinear coefficient, and a length of the optical fiber 52.

The optical filter 53 is the same as the optical filter 33 described with reference to FIG. 4. The optical filter 53 extracts and outputs the signal light $E_S$.

As described above, the optical signal-processing apparatus modulates the phase of the signal light $E_S$ having the wavelength $\lambda_S$, by the control light $E_{Ct}$ having the wavelength $\lambda_{Ct}$, in the optical fiber 52. This makes it possible to superpose information contained in the control light $E_{Ct}$ on the signal light $E_S$ having the wavelength $\lambda_S$ without performing photoelectric conversion of the signal light $E_S$.

Note that when the nonlinear optical medium is a third-order or second-order nonlinear optical medium, the signal light $E_S$ is subjected to optical phase modulation by the optical Kerr effect or the optical parametric effect of the control light $E_{Ct}$ (pump light) in the nonlinear optical medium. More specifically, it is possible to realize the optical phase modulation by using the third-order nonlinear optical medium, such as an optical fiber, or the second-order nonlinear optical medium, such as a $LiNbO_3$ (periodically-poled LN) waveguide having the quasi phase matching structure.

Further, the optical signal-processing apparatus illustrated in FIG. 6 is also capable of modulating the WDM signal as described with reference to FIG. 2, and is also capable of splitting the modulated WDM signal by the optical splitter as described with reference to FIG. 3.

Next, a seventh embodiment will be described in detail with reference to a drawing. In the seventh embodiment, a description will be given of modulation of a control light by the optical signal-processing apparatus.

Figure 7:
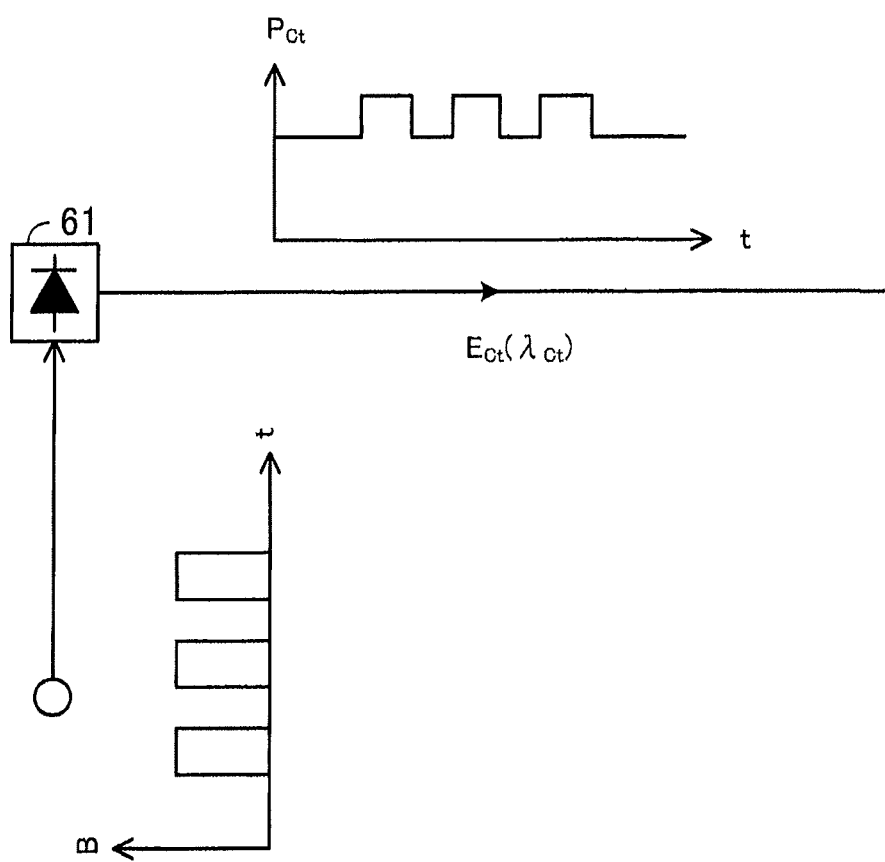
FIG. 7 illustrates an optical signal-processing apparatus according to a seventh embodiment.

FIG. 7 illustrates an optical signal-processing apparatus according to the seventh embodiment. As illustrated in FIG. 7, the optical signal-processing apparatus includes an LD (laser diode) 61.

A control signal B which is information illustrated in FIG. 7 is input to the LD 61. Here, the control signal B is created by a modulation method, such as amplitude modulation, phase modulation, frequency modulation, or, on an as-needed basis, multilevel modulation. The LD 61 outputs the control light $E_{Ct}$ having an optical power $P_{Ct}$ and a wavelength $\lambda_{Ct}$ illustrated in FIG. 7, according to the input control signal B. The control light $E_{Ct}$ is output e.g. to the optical modulator 1 or 11 illustrated in FIGS. 1 to 3, or the optical coupler 31, 41, or 51 illustrated in FIGS. 4 to 6.

As described above, the optical signal-processing apparatus modulates the control light $E_{Ct}$ using the control signal B which is information. This enables the optical signal-processing apparatus to modulate the signal light $E_S$ by the control light $E_{Ct}$ having the information.

Next, an eighth embodiment will be described in detail with reference to a drawing. In the eighth embodiment, a description will be given of another example of modulation of the control light by the optical signal-processing apparatus.

Figure 8:
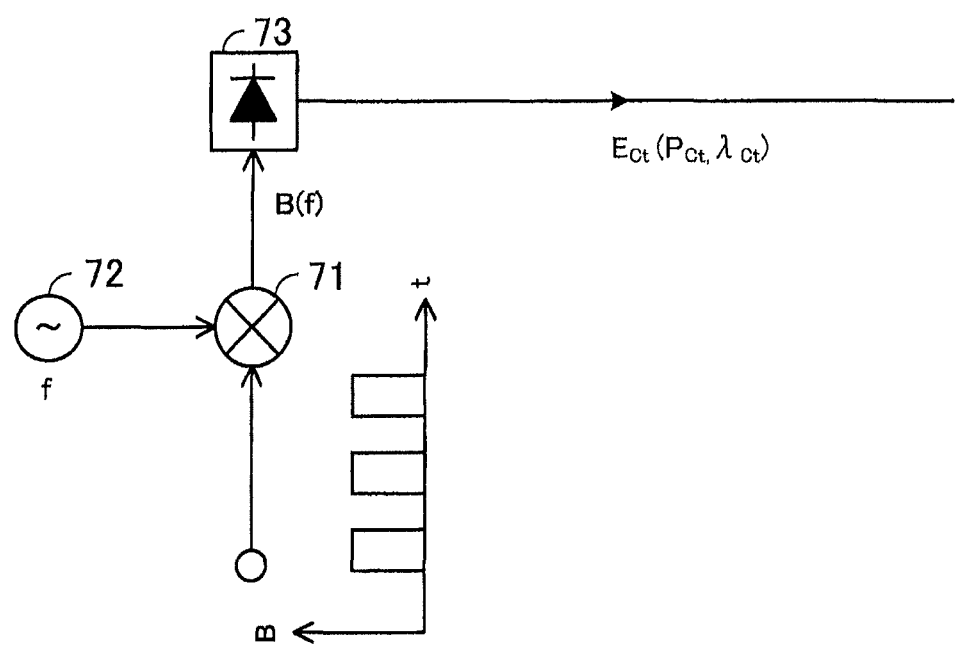
FIG. 8 illustrates an optical signal-processing apparatus according to an eighth embodiment.

FIG. 8 illustrates an optical signal-processing apparatus according to the eighth embodiment. As illustrated in FIG. 8, the optical signal-processing apparatus includes a multiplier 71, a local oscillator 72, and an LD 73.

The multiplier 71 multiplies the control signal B and a RF (radio frequency) carrier wave (subcarrier signal) output from the oscillator 72. The oscillator 72 outputs e.g. a carrier wave having a frequency of f. As a consequence, from the multiplier 71, the control signal B(f) is output which is formed by modulating (subcarrier-modulating) the carrier wave having a frequency of f by the information signal.

The LD 73 is driven by modulated current by the control signal B(f) output from the multiplier 71, and accordingly outputs the control light $E_{Ct}$ having the optical power $P_{Ct}$ and the wavelength $\lambda_{Ct}$.

That is, the optical carrier is subcarrier-modulated at frequency f using the information signal B, and the control light $E_{Ct}$ is output from the LD 73. The control light $E_{Ct}$ is output e.g. to the optical modulator 1 or 11 illustrated in FIGS. 1 to 3, or the optical coupler 31, 41, or 51 illustrated in FIGS. 4 to 6.

As described above, the optical signal-processing apparatus outputs the subcarrier (RF-carrier) wave modulated by the control signal B which is data information, in a state superposed on (having modulated) the optical carrier. This enables the optical signal-processing apparatus to modulate the signal light $E_S$ by the control light $E_{Ct}$ having the subcarrier-modulated data information with the subcarrier frequency of f.

Although the above description has been given of a method of directly modulating the laser using the LD 61 or 73 as the modulator, by way of example, the modulation may be performed using an external modulator for a continuous wave light. Examples of the external modulator include a $LiNbO_3$ intensity/phase modulator, an electronic absorption (EA) modulator, a semiconductor optical amplifier, and a nonlinear optical medium. Further, any of methods including methods of amplitude modulation, phase modulation, and frequency modulation, can be applied to the modulation method.

Further, when the signal light $E_S$ is a data modulated light, it is possible, by setting the above-mentioned frequency f to a frequency sufficiently higher than the baseband of the data signal, to prevent the signal quality from being degraded due to existence of the data signal of the signal light $E_S$ and the control signal B in the same frequency band.

Figure 9:
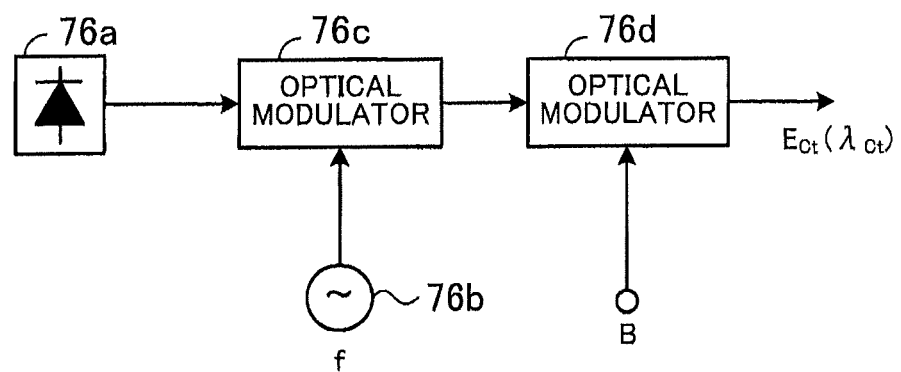
FIG. 9 illustrates another example of modulation of a control light performed in the optical signal-processing apparatus.

FIG. 9 illustrates another example of modulation of the control light performed in the optical signal-processing apparatus. As illustrated in FIG. 9, the optical signal-processing apparatus includes an LD 76a, a local oscillator 76b which outputs a signal having a frequency of f, an optical modulator 76c to which the signal having a frequency of f is input, and an optical modulator 76d to which the information signal B is input.

As illustrated in FIG. 9, this example is effective e.g. in a case where two external modulators are used with respect to the frequency f and the control signal B, and a case where relatively high speed information is superposed using the high frequency f.

Although in the FIG. 6 example, the description has been given of the case where phase modulation is a binary modulation of $\phi_1$ and $\phi_2$ for simplicity, when optical subcarrier modulation is performed using the above-mentioned XPM, the optical modulation, including amplitude modulation, is analog modulation.

Next, a ninth embodiment will be described in detail with reference to a drawing. In the ninth embodiment, a description will be given of a receiving apparatus that demodulates data information.

Figure 10:
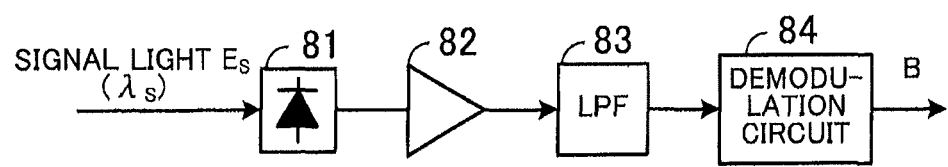
FIG. 10 illustrates a receiving apparatus according to a ninth embodiment.

FIG. 10 illustrates a receiving apparatus according to the ninth embodiment. As illustrated in FIG. 10, the optical signal-processing apparatus includes a PD (Photo Diode) 81, an amplifier 82, a LPF (Low Pass Filter) 83, and a demodulation circuit 84. The receiving apparatus illustrated in FIG. 10 demodulates e.g. the control signal B described with reference to FIG. 7.

The signal light $E_S$ is input to the PD 81. The PD 81 is an optical receiving apparatus which converts the signal light $E_S$ to an electric signal, and the PD 81 outputs e.g. an electric signal having a waveform illustrated in the modulated light $E_0$ in FIG. 4.

The amplifier 82 amplifies an electric signal output from the PD 81. The LPF 83 passes a low frequency band of the electric signal amplified by the amplifier 82. For example, the LPF 83 passes an envelope having a waveform illustrated in the modulated light $E_0$ in FIG. 4.

The demodulation circuit 84 is e.g. a circuit for demodulating the control signal B according to the modulation method of the control signal B. Note that when the control signal B is intensity-modulated, the demodulation circuit 84 is not needed.

As mentioned above, the receiving apparatus is capable of demodulating information (control signal B) from the signal light $E_S$.

Note that a digital signal-processing circuit that demodulates information or eliminates erroneous detection, fluctuations, etc. of the demodulated information may be disposed downstream of the demodulation circuit 84.

Figure 11:
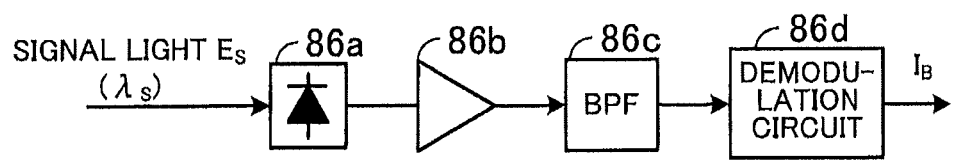
FIG. 11 illustrates an example of a receiving apparatus that demodulates an optical signal modulated by an RF carrier wave.

FIG. 11 illustrates an example of a receiving apparatus that demodulates an optical signal modulated by the subcarrier (RF-carrier) wave, as described with reference to FIG. 8. As illustrated in FIG. 11, the receiving apparatus includes a PD 86a, an amplifier 86b, a BPF (Band-pass filter) 86c, and a demodulation circuit 86d.

The receiving apparatus illustrated in FIG. 11 converts a signal light to an electric signal using the PD 86a, and transmits the electric signal through the BPF 86c which passes the electric signal in a band around the frequency f of the sub-carrier signal. Thereafter, the control signal B is demodulated using the demodulation circuit 86d.

Next, a tenth embodiment as an example of the receiving apparatus illustrated in FIG. 11 will be described in detail with reference to a drawing. In the tenth embodiment, a description will be given of another example of the receiving apparatus that demodulates information.

Figure 12:
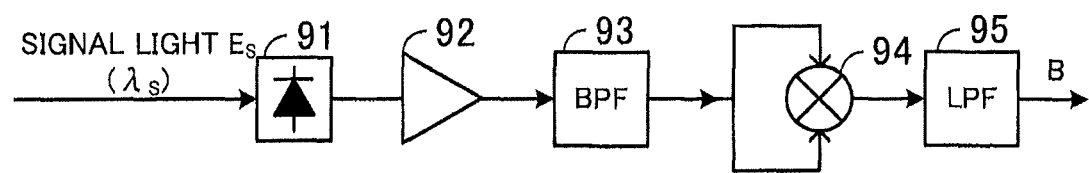
FIG. 12 illustrates a receiving apparatus according to a tenth embodiment.

FIG. 12 illustrates the receiving apparatus according to the tenth embodiment. As illustrated in FIG. 12, the receiving apparatus includes a PD 91, an amplifier 92, a BPF 93, a multiplier 94, and a LPF 95. The receiving apparatus illustrated in FIG. 12 demodulates e.g. the control signal B described with reference to FIG. 8.

The signal light $E_S$ is input to the PD 91. The PD 91 is an optical receiving apparatus that converts the signal light $E_S$ to an electric signal, and the PD 91 outputs a control signal B(f) which is obtained, e.g. as described with reference to FIG. 8, by converting (subcarrier-modulating) the optical signal modulated by the sub-carrier (RF-carrier) wave to an electric signal.

The amplifier 92 amplifies the electric signal output from the PD 91. The BPF 93 is a band pass filter which passes the electric signal amplified by the amplifier 92 in a band around a frequency of the sub-carrier signal. The frequency in a main pass band of the BPF 93 is set e.g. to the frequency f of the local oscillator 72 described with reference to FIG. 8.

In the FIG. 12 example, the multiplier 94 forms a square-law detector, and outputs an envelope of a received signal. The LPF 95 passes low-frequency components of a signal output from the square-law detector. For example, the LPF 95 passes signals in a band not higher than the baseband of the control signal B described with reference to FIG. 8. This makes it possible to obtain e.g. the control signal B having information, described with reference to FIG. 8. Note that as the square-law detector, it is possible to use not only the above-mentioned configuration, but also an envelope detector such as a half-wave rectifier circuit using a resistor, a capacitor, and a coil, or the like.

As described above, the receiving apparatus is capable of demodulating the subcarrier-modulated information (control signal B(f)) from the signal light $E_S$.

Note that in the receiving apparatus in FIG. 12, the local light and the signal light $E_S$ may be combined and then input to the PD 91. It is assumed that the frequency (wavelength) of the local light differs from the frequency (wavelength) of the signal light by a desired mistuned frequency ($f_{IF}$). This makes it possible to obtain an electric signal in an intermediate frequency band ($f_{IF}$) from the PD 91.

Further, a digital signal-processing circuit which demodulates information or eliminates an erroneous detection, fluctuations, etc. of the demodulated information may be disposed downstream of the LPF 95.

Next, an eleventh embodiment will be described in detail with reference to a drawing. In the eleventh embodiment, a description will be given of still another example of the receiving apparatus that demodulates information.

Figure 13:
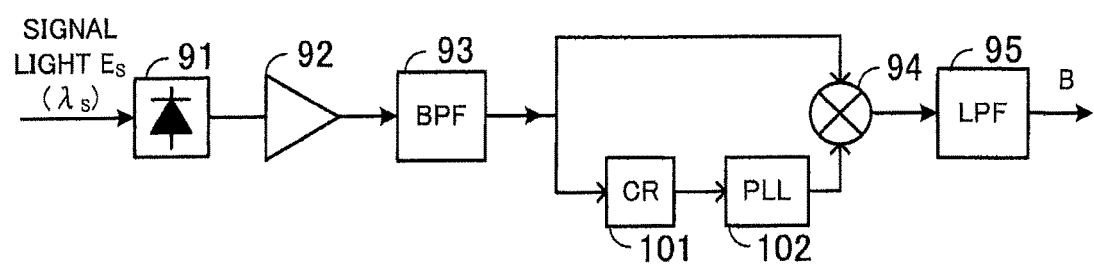
FIG. 13 illustrates a receiving apparatus according to an eleventh embodiment.

FIG. 13 illustrates a receiving apparatus according to the eleventh embodiment. In FIG. 13, components identical to those in FIG. 12 are denoted by identical reference numerals, and description thereof is omitted.

In the receiving apparatus in FIG. 13, a CR (Clock Recovery) circuit 101 and a PLL (Phase-lock loop) circuit 102 are provided at one of inputs of the square-law detector of the multiplier 94.

The CR circuit 101 generates a clock signal having a frequency of a sub-carrier signal, based on an electric signal output from the BPF 93. For example, the CR circuit 101 generates a clock signal having the frequency f of the local oscillator 72 described with reference to FIG. 8.

The PLL circuit 102 synchronizes the phase of an electric signal output from the BPF 93 and to be input to the multiplier 94, with the phase of a clock signal output from the CR circuit 101.

As described above, the receiving apparatus demodulates the subcarrier-modulated phase information (control signal B(f)) from the signal light $E_S$ even by a synchronous detector having the CR circuit 101 and the PLL circuit 102 connected to one of the inputs thereof.

Next, a twelfth embodiment will be described in detail with reference to a drawing. In the twelfth embodiment, a description will be given of an optical network to which the optical signal-processing apparatus is applied.

Figure 14:
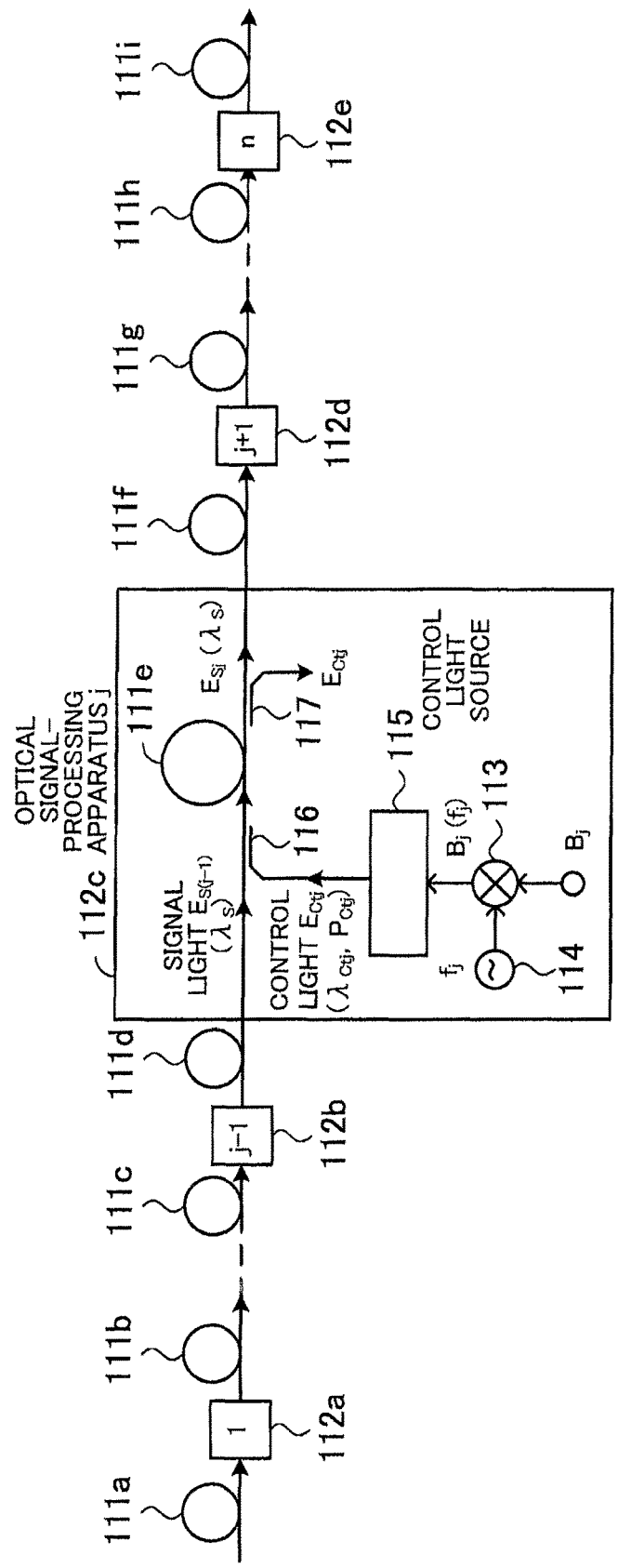
FIG. 14 illustrates an optical network according to a twelfth embodiment.

FIG. 14 illustrates the optical network according to the twelfth embodiment. As illustrated in FIG. 14, the optical network includes optical fibers 111a to 111i, and optical signal-processing apparatuses 112a to 112e. The optical signal-processing apparatuses 112a to 112e are sometimes referred to as the first, . . . , j−1th, jth, j+1th, . . . , and nth optical signal-processing apparatuses from the left side as viewed in FIG. 14, respectively.

The jth optical signal-processing apparatus 112c includes a multiplier 113, a local oscillator 114, a control light source 115, an optical combiner 116, an optical splitter 117, and an optical fiber 111e. The multiplier 113, the local oscillator 114, and the control light source 115 correspond e.g. to the multiplier 71, the local oscillator 72, and the LD 73 illustrated in FIG. 8, respectively, for example, and detailed description thereof is omitted.

The optical combiner 116 combines the control light $E_{Ct}$ output from the control light source 115 with the signal light $E_S$ propagating through the optical network. The optical splitter 117 splits off the control light $E_{ctj}$ from the signal light $E_S$ propagating through the optical network. That is, the optical splitter 117 prevents the control light $E_{ctj}$ from propagating through the optical network downstream thereof. The optical combiner 116 and the optical splitter 117 are e.g. WDM couplers.

The optical signal-processing apparatuses 112a to 112e may modulate the signal light $E_S$ by the control light $E_{ctj}$ using part of the laid optical fibers forming the optical network.

The signal light $E_S$ modulated by the control light $E_{ctj}$, though not illustrated in FIG. 14, is demodulated e.g. by the receiving apparatus illustrated in FIG. 11, FIG. 12, or FIG. 13. For example, an optical coupler for branching the signal lights $E_S$ is provided at a predetermined location in the optical network, and the modulated signal light $E_S$ is received by the PD 91 illustrated in FIG. 12 or 13 to demodulate the information.

The optical signal-processing apparatuses 112a, 112b, 112d, and 112e each include the same multiplier, local oscillator, and control light source as those included in the optical signal-processing apparatus 112c. The local oscillator 114 of the jth optical signal-processing apparatus 112c outputs an oscillation signal having a sub-carrier frequency of $f_j$, and the local oscillators of the other optical signal-processing apparatuses output oscillation signals having respective sub-carrier frequencies $f_1$ to $f_n$. That is, each optical signal-processing apparatus has assigned thereto one of a plurality of sub-carrier signals different in frequency, and performs optical modulation using the control signal $B_j(f_j)$ formed by subcarrier-modulating the control signal $B_j$.

Therefore, the control light $E_{ctj}$ as the locally generated information which is subcarrier-modulated by the frequency $f_j$ (j=1, . . . , or n) is sequentially superposed on the signal light $E_S$ having the wavelength $\lambda_S$ and propagating through the optical network, and the receiving apparatus is capable of demodulating the locally generated information contained in the control light $E_{ctj}$ by discriminating the same according to the frequency.

As described above, the optical signal-processing apparatuses inserted in the optical network superpose respective control lights of information pieces, which are subcarrier-modulated by respective different frequencies, on the signal light. This enables the receiving apparatus to distinguish and demodulate a plurality of different information pieces contained in respective control lights.

Figure 15:
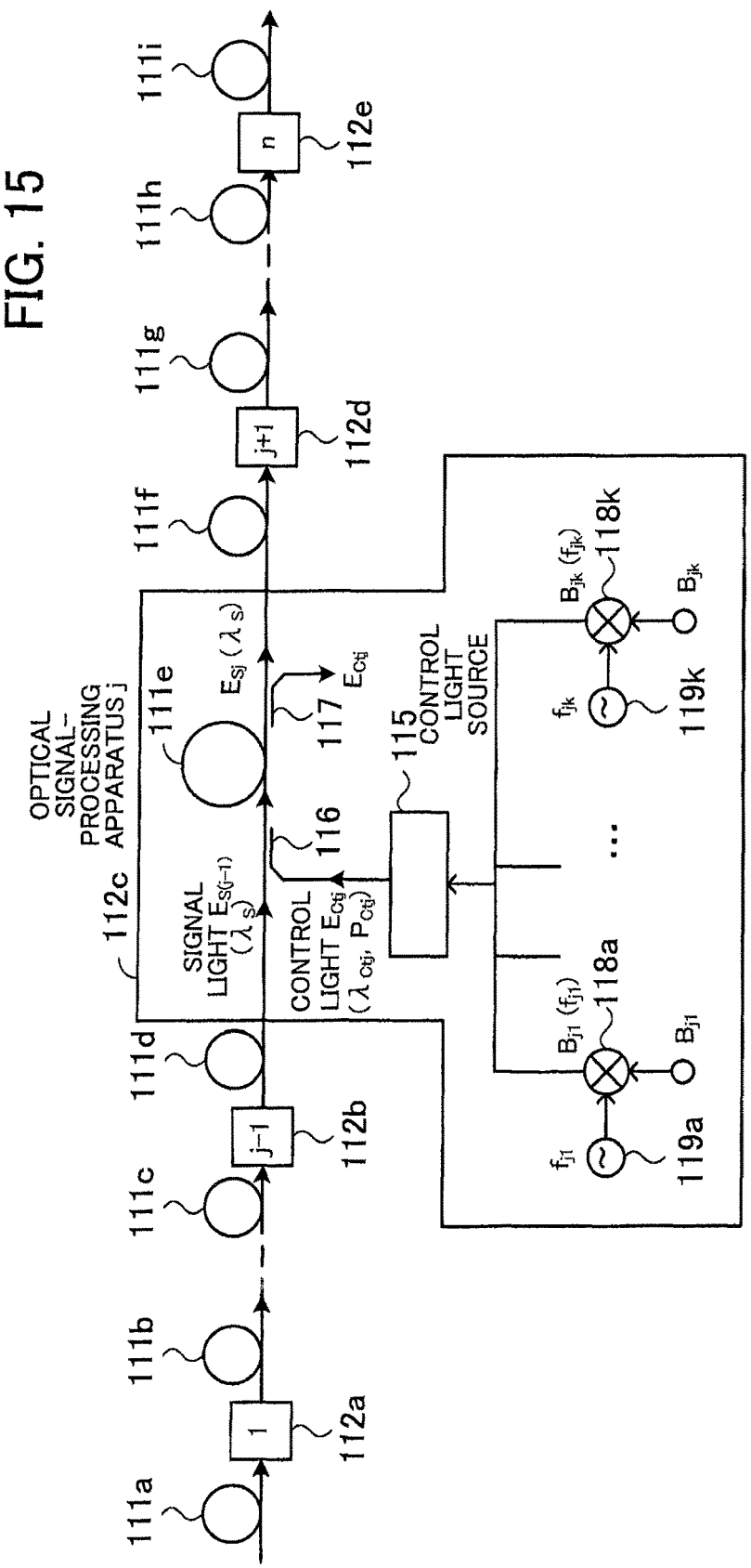
FIG. 15 illustrates an example of a case where optical modulation is performed using frequency-division multiplexing.

FIG. 15 illustrates an example of a case where optical modulation is performed using frequency-division multiplexed signal. In FIG. 15, components identical to those in FIG. 14 are denoted by identical reference numerals, and description thereof is omitted.

In FIG. 15, the optical signal-processing apparatus 112c includes multipliers 118a to 118k and local oscillators 119a to 119k. The local oscillators 119a to 119k output carriers having respective frequencies $f_{j1}$ to $f_{jk}$. The multipliers 118a to 118k have input thereto control signals $B_{j1}$ to $B_{jk}$ and carriers having frequencies $f_{j1}$ to $f_{jk}$, respectively, and multiply these signals to output the product to the control light source 115.

Although FIG. 14 illustrates the example of modulation using one control signal $B_j(f_j)$ identified by the frequency $f_j$ by each optical signal-processing apparatus j, optical modulation may be performed using a frequency-division multiplexed (FDM) signal of sub-carrier signals generated by modulating carrier waves $f_{j1}, \ldots,$ and $f_{jk}$ having respective frequencies, by the control signals $B_{j1}, \ldots,$ and $B_{jk}$, respectively, as illustrated in FIG. 15.

When a plurality of information data items exist at a point where optical modulation is to be performed, the information data items are subjected to FDM, and then the optical modulation is performed, whereby it is made possible to collectively superpose the plurality of information data items on one optical carrier. The FDM signal has excellent matching properties with already developed techniques, such as a microwave technology, and it is possible to use various types of electrical signal processing in combination. Particularly, in using an orthogonal FDM (OFDM: Orthogonal Frequency Division Multiplexing) signal, normal signal processing, such as serial parallel conversion, inverse discrete Fourier transform, or parallel serial conversion, is used. Information is obtained in the optical network or another optical network by extracting a FDM signal and demodulating each sub-carrier signal.

Further, the optical signal-processing apparatus is capable of transmitting the modulated signal light $E_S$ to another optical network, and the receiving apparatus in the other optical network is capable of receiving and modulating the signal light $E_S$.

Figure 16:
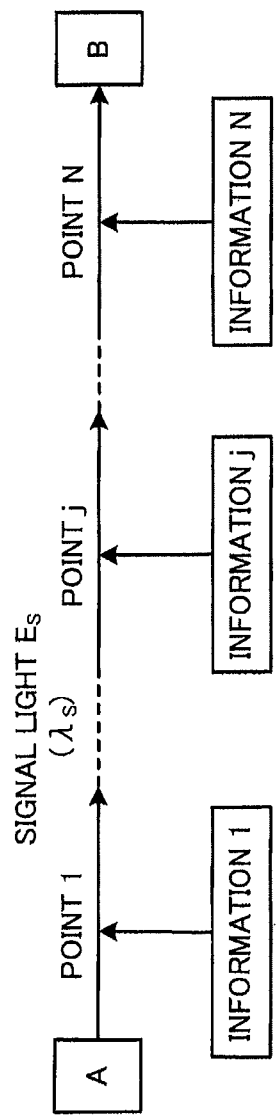
FIG. 16 illustrates an example of application of the optical signal-processing apparatus.
Figure 17:
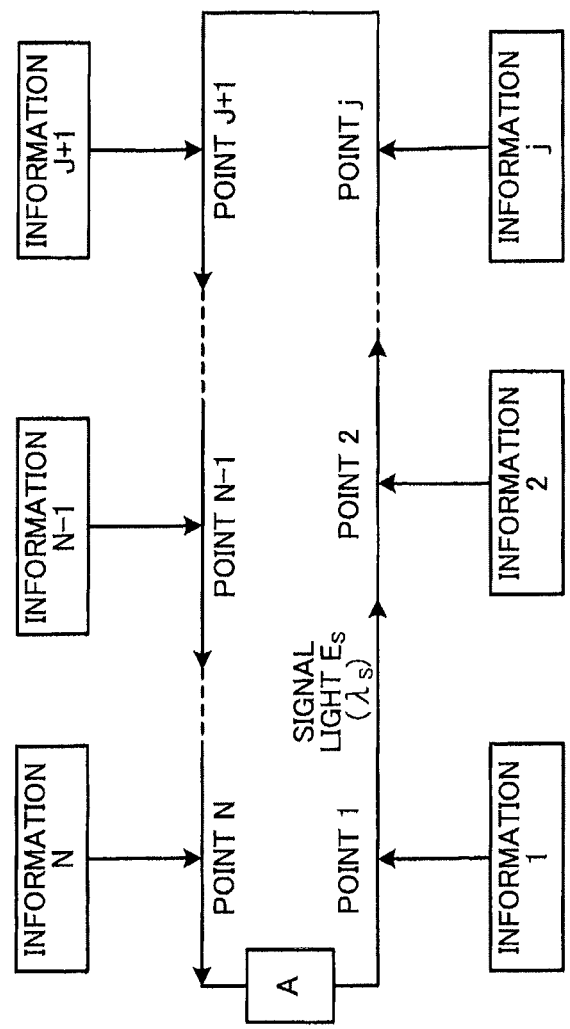
FIG. 17 illustrates an example of application of the optical signal-processing apparatus.

FIGS. 16 and 17 illustrate examples of application of the optical signal-processing apparatus. In applying the optical signal-processing apparatus, configurations as illustrated in FIGS. 16 and 17 are envisaged. In FIG. 16, a signal light is propagated from a point A toward a point B, information pieces 1, . . . , and N are superposed on the signal light by optical signal-processing apparatuses at desired intermediate points 1, . . . , and N, respectively, and then the superposed signal is received at the point B. It is possible to envisage application not only to ordinary information communication but also to communication in one direction in bidirectional communication, transmission of monitor information, optical wiring, etc.

On the other hand, in the case of FIG. 17, a signal light is propagated from the point A, information items 1, . . . , and N are superposed on the signal light by optical signal-processing apparatuses at desired intermediate points 1, . . . , and N, respectively, and then the superposed signal is transmitted up to the point A, where the superposed signal is received. It is possible to envisage application to collection and transmission of monitored information within the network, control information, and request information, bidirectional communication information, etc.

Note that in the embodiments illustrated in FIGS. 14 to 17, it is also possible to extract and observe information having been superposed on the signal light $E_S$ by an upstream optical signal-processing apparatus, at a desired intermediate point. As an extraction method used in this case, it is possible to use, for example, a method of tapping part of the signal light $E_S$ by a power branching circuit or the like, or a method of combining a CW light having the same wavelength as the control light $E_{Ct}$ in FIG. 5 with the signal light $E_S$, with the configuration illustrated in FIG. 5, and extracting a generated idler light e.g. by an optical filter or a WDM coupler.

The optical signal-processing apparatus is capable of collectively superposing control signals (information pieces) on the WDM signal light, and hence it is possible to distribute the information pieces contained in the control signals through the network on a real-time basis. By disposing a short optical fiber which does not affect a signal light at each point j, and disposing a WDM coupler for combining and splitting off a control light at input and output ends of the optical fiber, whereby even when data information is sent by the signal light, it is possible to superpose the locally-generated control signal almost without affecting the signal light. As the short optical fiber, there is used, specifically, an optical fiber which is several meters to several tens meters long and causes a nonlinear optical effect, and which hardly generates the nonlinear effect in the power of the signal light itself. The control light having a sufficient power to superpose a control signal is input to the optical fiber. For example, when superposing amplitude modulation of 0.1% (mark rate of ½) on a signal light, if an optical fiber having a length of 20 m and a nonlinear coefficient 20 (1/W/km) is used, necessary power of the control light is approximately equal to 50 mW. An actually needed degree of modulation depends on a method of modulation to be given (amplitude modulation or phase modulation), a bit rate of the control signal, detection sensitivity, and so forth.

Alternatively, a monitor signal may be superposed by extracting an appropriate length of a transmission fiber, disposing WDM couplers at front and rear ends of the fiber, and thereby using the nonlinear optical effect within the transmission fiber. The nonlinear coefficient of an ordinary transmission fiber is approximately equal to 2 (1/W/km), and hence, in the above-mentioned model, the transmission fiber having a length of approximately several hundreds meters makes it possible to realize monitoring the optical network. In the actual optical network, if it is possible to use part of the transmission fiber as an optical modulator as mentioned above, the optical network can be monitored anywhere within the optical network. Further, in doing this, if no control light is input, the signal light is not affected at all, and matching properties with conventional systems are excellent.

Particularly, in a case where a medium improved in the nonlinear effect is to be used, there may be employed, as an optical fiber, for example, a highly nonlinear fiber (HNLF) to begin with, and a fiber or waveguide configuration in which a nonlinear refractive index is increased by doping a core with e.g. germanium or bismuth, a fiber or waveguide configuration in which an optical intensity is increased by reducing a mode field, a fiber or waveguide configuration which uses chalcogenide glass or $Bi_2O_3$ glass, a photonic crystal fiber or waveguide configuration, and so forth. Further, as another nonlinear optical medium, there can be also employed a semiconductor optical amplifier having a quantum well structure, a quantum dot semiconductor optical amplifier, a silicon photonics waveguide, InGaAsP photonics waveguide, etc. Further, as still another nonlinear optical medium, it is also possible to use a device that generates a second-order nonlinear optical effect, such as three-optical-wave mixing. In this case, it is possible to use e.g. a $LiNbO_3$ waveguide having a quasi phase matching structure, a GaAlAs element, or a second-order nonlinear optical crystal, for these devices. Also in the case of using the second-order nonlinear optical medium, a configuration is preferable in which wavelength arrangement enables phase matching.

Next, a thirteenth embodiment will be described in detail with reference to a drawing. In the thirteenth embodiment, a description will be given of a feedback process executed by the optical signal-processing apparatus.

Figure 18:
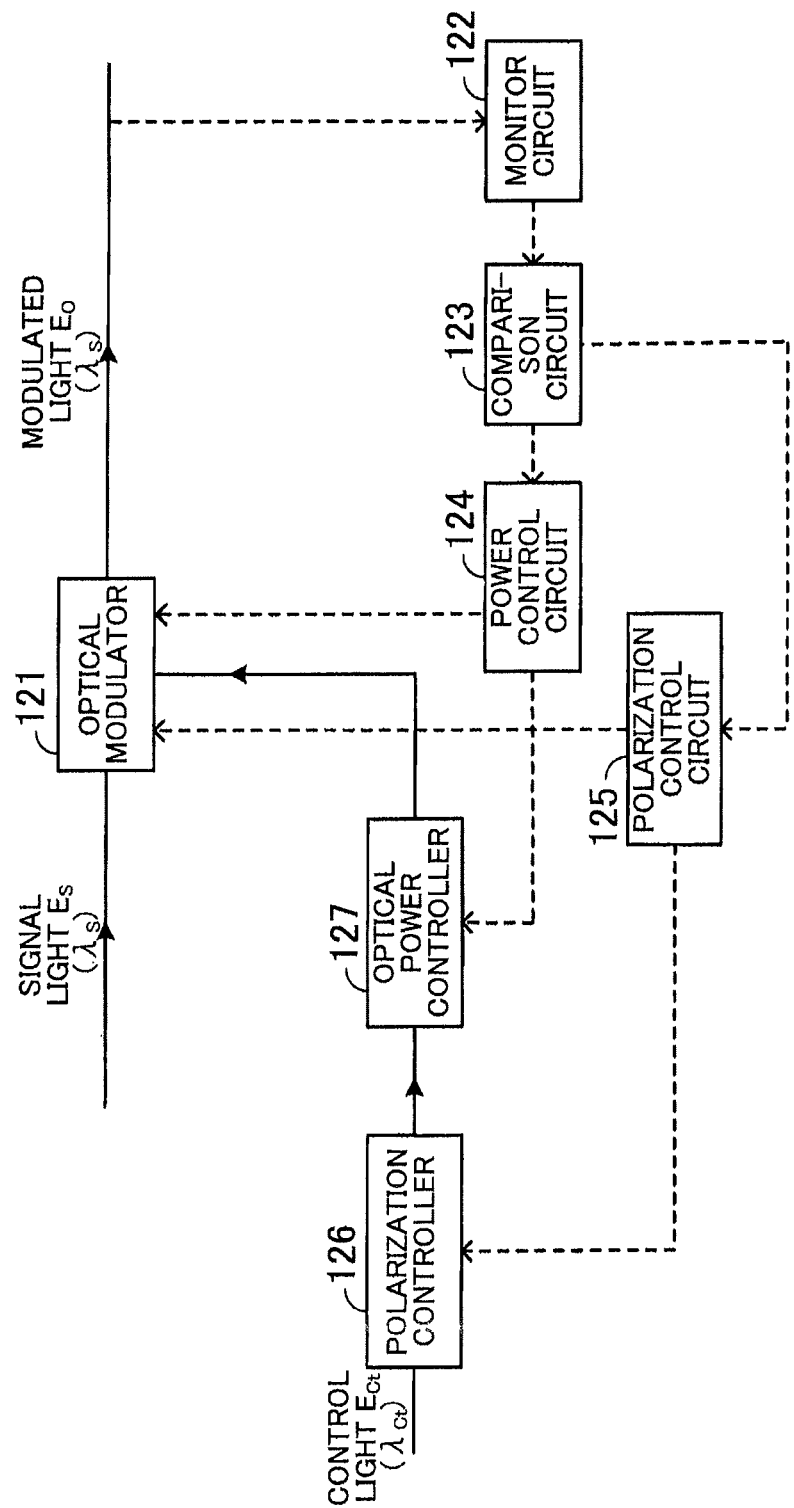
FIG. 18 illustrates an optical signal-processing apparatus according to a thirteenth embodiment.

FIG. 18 illustrates an optical signal-processing apparatus according to the thirteenth embodiment. As illustrated in FIG. 18, the optical signal-processing apparatus includes an optical modulator 121, a monitor circuit 122, a comparison circuit 123, a power control circuit 124, a polarization control circuit 125, a polarization controller 126, and an optical power controller 127.

The optical modulator 121 corresponds e.g. to the optical modulator 1 illustrated in FIG. 1.

The monitor circuit 122 monitors the quality of a modulated signal light output from the optical modulator 121. The monitor circuit 122 includes e.g. a filter for extracting the wavelength of the modulated signal light, and a light receiving element for receiving a signal light extracted by the filter.

The comparison circuit 123 calculates operating characteristics of optical modulation based on the optical power, a waveform, a spectrum, etc. of the modulated signal light monitored by the monitor circuit 122, and compares the calculated characteristics with predetermined threshold values.

The power control circuit 124 controls the optical power of the control light and the signal light concerning the optical modulation based on the results of comparison output from the comparison circuit 123. For example, the power control circuit 124 controls the optical power controller 127 that controls the optical power of the control light. Also, the power control circuit 124 controls the optical power controller that controls a modulated state of the signal light included in the optical modulator 121.

The polarization control circuit 125 controls polarization states of the control light and the signal light concerning the optical modulation based on the results of the comparison by the comparison circuit 123. For example, the polarization control circuit 125 controls the polarization controller 126 that controls the polarization state of the control light. Also, the polarization control circuit 125 controls a polarization controller provided in the optical modulator 121, for controlling the polarization state of the signal light.

When necessary, the control light $E_{ct}$ is input to the polarization controller 126. The polarization controller 126 controls the polarization state of the control light $E_{ct}$ according to the control by the polarization control circuit 125.

The optical signal-processing apparatus performs the feedback control as described above, whereby it is possible to output a properly modulated signal light from the optical modulator 121.

According to the above-described optical signal-processing apparatus, it is possible to reduce the power loss.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A receiving apparatus comprising:
    a light receiver to receive a modulated light modulated by an optical modulator that combines and inputs a first signal light propagating through an optical network and a second signal light having information concerning the optical network, to a nonlinear optical medium, and modulates the first signal light according to changes in intensity of the second signal light, in the nonlinear optical medium, and convert the modulated light to an electrical signal,
    wherein the information contained in the second signal light has been subcarrier-modulated by a sub-carrier signal;
    a band pass filter to extract a signal of a frequency component of the sub-carrier signal from the electric signal to which the modulated light is converted by the light receiver; and
    a demodulator to demodulate the information contained in the second signal light, based on the electric signal to which the modulated light is converted by the light receiver,
    wherein the demodulator includes a clock recovery circuit, a phase-lock loop circuit, a square-law detector and a low pass filter,
        the clock recovery circuit to generate a clock signal having a frequency of the sub-carrier signal, based on a first signal extracted from the band pass filter,
        the phase-lock loop circuit to synchronize a phase of the first signal from the band pass filter with a phase of the clock signal from the clock recovery circuit and to generate a second signal,
        the square-law detector to output an envelope signal by multiplexing the first signal and the second signal, and
        the low pass filter to pass information, from among the information, being equal to low-frequency components of the envelope signal output from the square-law detector.

* * * * *